Dec. 25, 1956                E. J. VALLEN                2,775,320
                              MOTOR BRAKE
Filed Nov. 30, 1951                                    2 Sheets-Sheet 1

INVENTOR.
EARL J. VALLEN
BY
Gordon C. Mark
ATTORNEY

Dec. 25, 1956     E. J. VALLEN     2,775,320
MOTOR BRAKE
Filed Nov. 30, 1951     2 Sheets-Sheet 2
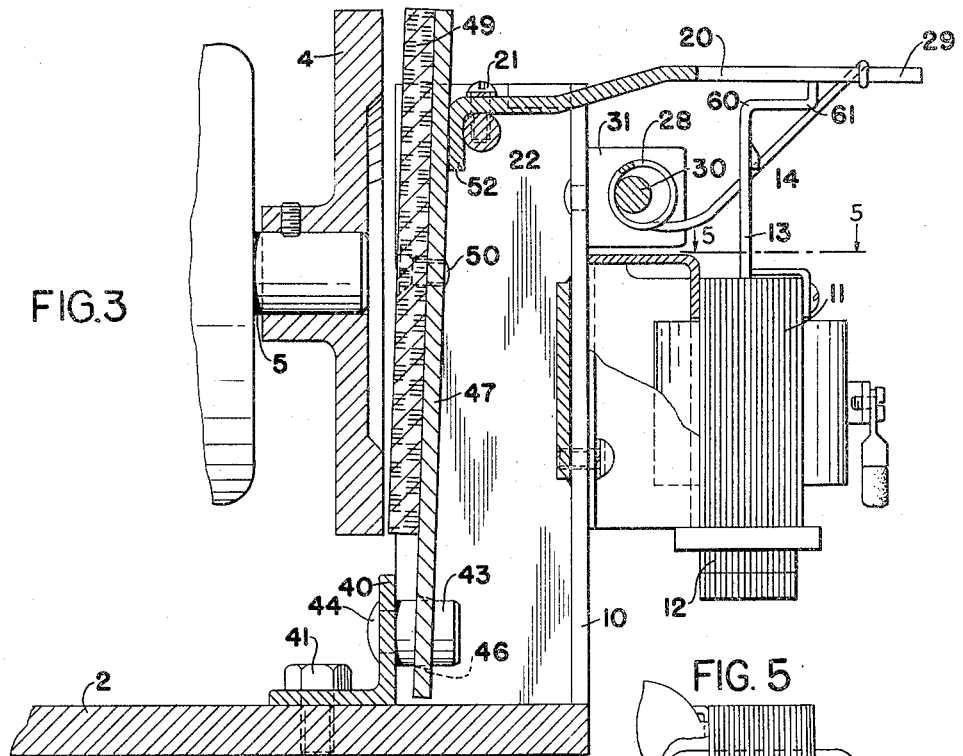
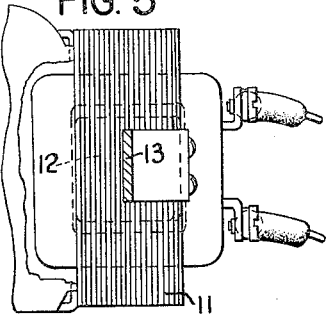
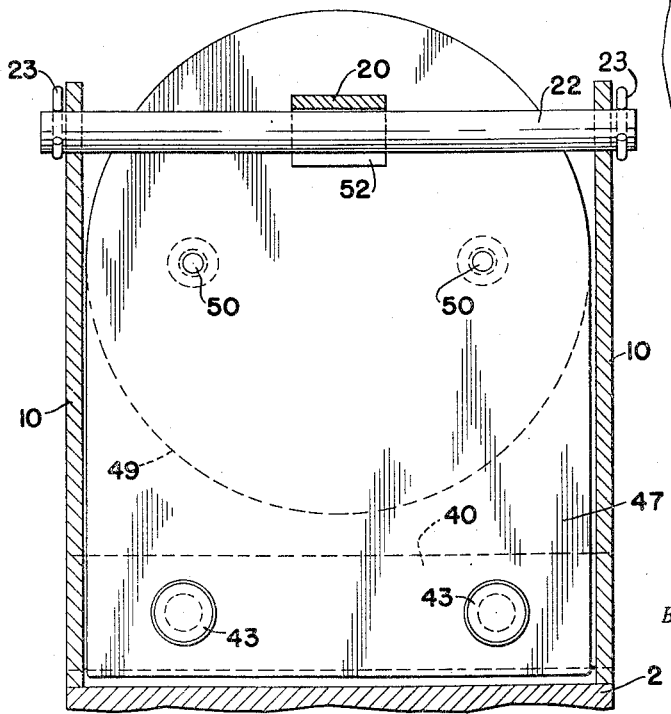
*INVENTOR.*
EARL J. VALLEN
BY
*ATTORNEY*

United States Patent Office 2,775,320
Patented Dec. 25, 1956

2,775,320

MOTOR BRAKE

Earl Jacob Vallen, Akron, Ohio

Application November 30, 1951, Serial No. 259,053

4 Claims. (Cl. 188—171)

This invention relates to a motor brake. It is designed more particularly for motors of a fractional horsepower, up to one or two horsepower, or somewhat more. The brake is operated by a solenoid against a spring-pressed lever which moves the brake plate. The brake plate is preferably slidably, as well as pivotally, mounted. The pressure of the spring on the lever is advantageously made easily adjustable so that greater pressure can be used on larger motors and less pressure on smaller motors. As the braking surface wears down the brake plate will slide on its support and so is self-aligning.

The invention will be further described in connection with the drawings, in which—

Fig. 3 is a section through the brake and a part of the motor on the line 3—3 of Fig. 1, but with the brake off;

Fig. 4 is a section on the line 4—4 of Fig. 1; and

Fig. 5 is a plan view of the top of the solenoid on the line 5—5 of Fig. 3.

Figure 1:
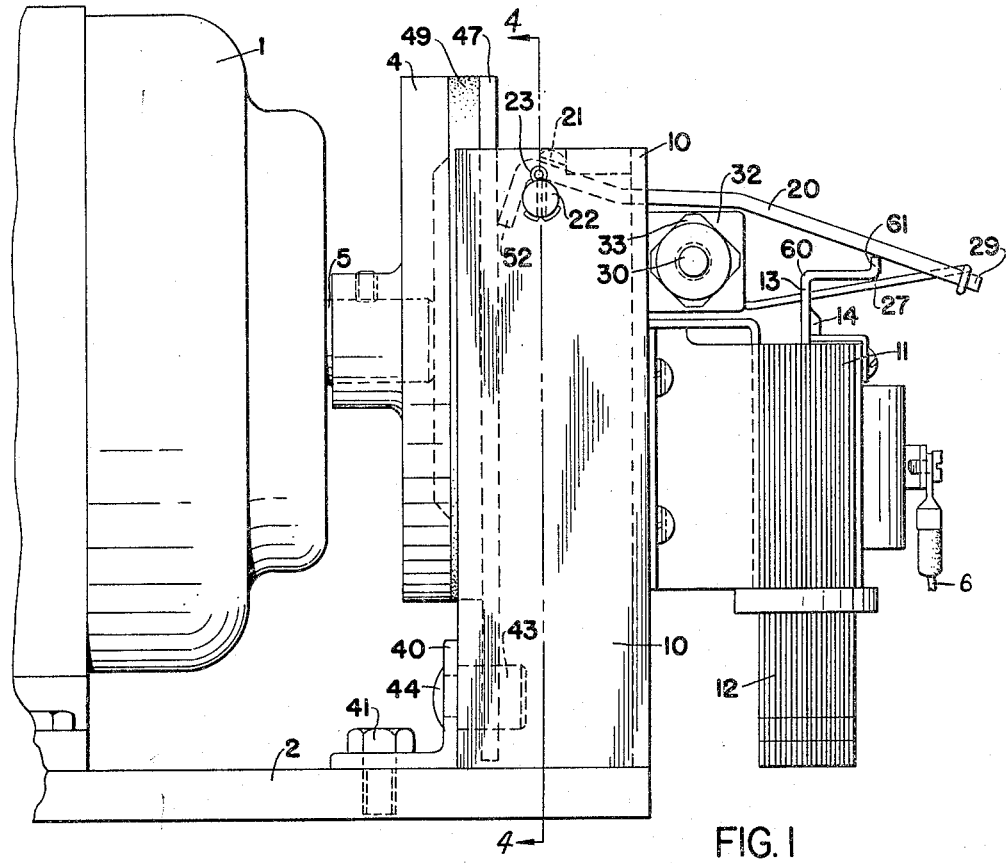
Fig. 1 is a side view of the brake showing a portion of a motor, with the brake plate applied to the disc of the motor.
Figure 2:
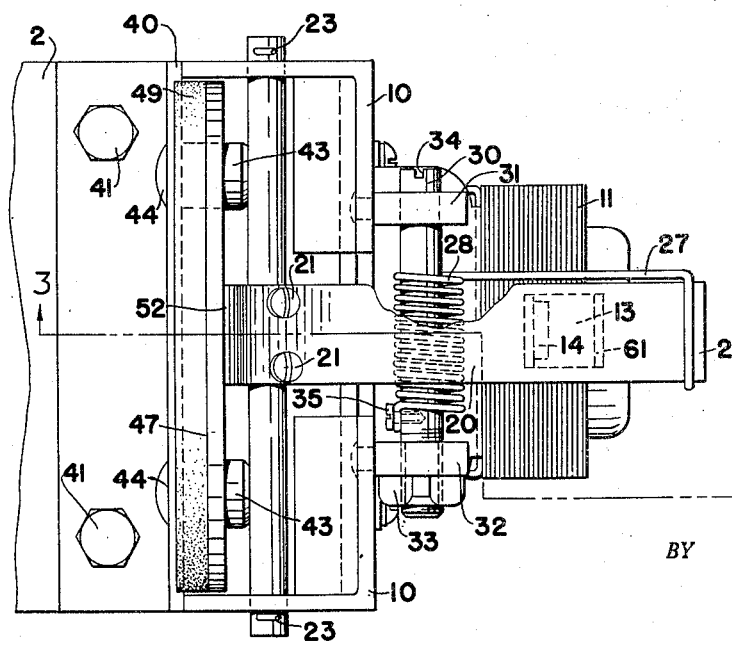
Fig. 2 is a plan view of the brake.

The motor 1 is supported on the base 2 which also supports the brake. The motor may be of any usual type in which power is delivered through the disc 4 which is mounted on the rotatable shaft 5. Current is supplied to the motor through the wires 6, the brake being connected in parallel with the motor.

The brake includes the three-sided support 10 on which the solenoid 11 is mounted. The core 12 is suspended from the plate 13. The stop 14 limits the downward movement of the core.

The bent lever 20 is bolted by the bolt 21 to the rod 22 which is pivotally mounted in the support 10. Cotter pins 23 prevent the rod from sliding out of its support.

One end 27 of the coil spring 28 is bent around the longer and substantially horizontal arm 29 of the lever 20. The coil is mounted on the rod 30. This rod is supported by the bracket 31 and threaded in the bracket 32. The nut 33 is a lock nut. The opposite end of the rod is slotted at 34. The end of the coil spring is held to rod 30 by screw 35. By loosening the lock nut 33 and turning rod 30 by a screwdriver inserted in the slot 33, the tension on the coil spring can be varied. The spring can be held under any desired tension by then tightening the lock nut 33.

The shell 10 is fastened to the base 2 by welding or other suitable means. The open side of the shell is closed at the bottom by the angle iron 40 which is held to the base by bolts 41. Horizontal studs 43 are held to the upright portion of the angle iron by bolts 44. Two circular holes 46 are provided in the bottom of the brake plate 47. These holes encircle the studs 43 on which the plate 47 is tiltably and slidably supported. A circular disc of cork 49 or the like is held to the plate by bolts 50. This cork contacts the face of the disc 4 of the motor when the brake is applied.

The lever 20 is bent at an angle which approaches a right angle. It may be somewhat more or less than a right angle. It is bent so that the acute angle formed by the bend opens downwardly. Thus, when current is flowing through the solenoid the horizontal arm 29 is raised and pulls the short arm 52 away from the disc 4, allowing the brake plate to tilt backwardly against it. As soon as the current stops flowing through the magnet of the solenoid 11 the core 12 drops, the arm 29 is pulled downwardly by the spring, and the short arm 52 is raised, pushing the cork or other braking surface of the brake plate against the face of the disc. As the cork surface wears the plate 47 is gradually moved toward the disc on the supports 43 by pressure of the arm 52, and the spring may be adjusted to compensate for this movement, if warranted. The brake plate is self-aligning because it is tiltably and slidably mounted.

The tension of the spring is adjusted by loosening the lock nut 33, turning the rod 30, and again tightening the lock nut. For small motors a pull of about four pounds will give efficient braking. For motors of greater horsepower a greater pull is necessary in order to brake the motor in the same length of time.

The upper end of the plate 13 is bent outwardly at 60 and then upwardly at 61 to lengthen the distance from the pivot 22 to the point at which the lever arm is contacted, and thus increase the advantage gained by use of the lever.

The brake is compact, efficient, relatively cheap to make and economical to operate. It may be built as a separate unit or it may be mounted on the motor support. The tie rods from the motor may be extended through the support 10 if desired, to more directly unify the brake with the motor.

What I claim is:

1. In a brake, a plate with a substantially flat braking surface slidably and tiltably mounted on two horizontal pins located below the portion of the brake which is adapted to be brought into braking contact with a rotatable element, the plate being mounted substantially perpendicularly to the axis of said rotatable element and being tiltably supported on the pins so that it can tilt away from said plate when not being pressed against it and can gradually slide toward said plate as the braking surface of the plate becomes worn away, and means for pressing the plate at a level above the pins toward the rotatable element.

2. In a brake adapted to apply pressure against a vertical disc attached to the rotor shaft of a motor, means providing a horizontal pivot adjacent the top of the disc, and parallel thereto and on the side of the disc away from the motor, a lever at least partially supported by the pivot and bent downwardly at an acute angle at the pivot, a solenoid with a vertical core adapted to move upward in the solenoid when current is passed therethrough and downward by gravity when the flow of current ceases, one arm of the lever being located in a relatively horizontal position above the core and adapted to be moved upward when the core is moved up in the solenoid, the other arm of the lever being in a relatively vertical position with its lower end adapted to move toward the motor when the first arm moves down, a coil spring on a rod adjacent the first arm and having one end affixed to the rod and the other end affixed toward the outer end of the first arm and tending to move it downwardly, the spring being mounted with its coil adjustable to vary the downward force applied to said outer end, two substantially horizontal pins mounted parallel to the shaft of the motor and with a brake plate slidably and tiltably mounted thereon so that it tilts toward the pivot when the lower end of said second arm is moved in a direction away from the motor, the braking surface of said brake plate being adapted to be moved by the second arm into contact with the disc when said first arm is moved down by the spring as the core of the solenoid moves down when current ceases to flow through the solenoid.

3. In a brake for a motor with rotatable means having a flat surface fastened perpendicularly to the rotor shaft thereof, the improvement which includes a plate with a braking surface, a lever, means at one end of the lever for pressing the plate so as to bring the braking surface into contact with said flat surface, a spring mounted on a rod with one end of the spring fastened to the rod and the other end of the spring fastened to the other end of the lever for effecting said pressure contact, and means for adjusting the coil of the spring to vary its relation with respect to said pressing means so as to vary the pressure of the braking surface against the flat surface.

4. A motor brake which includes a plate adapted to apply pressure against the face of a rotatable disc on the rotor shaft of a motor, a lever pivoted on an axle in a plane perpendicular to the axis of the rotor shaft, and a coil spring coiled about a rod with one end of the spring fastened to the rod and the other end of the spring fastened to the lever and pressing one arm of it against the plate, the coil of the spring being parallel to said axle, and means for adjustably fastening the coil in different angular positions relative to its axis to thereby vary the spring pressure applied to the plate.

References Cited in the file of this patent
UNITED STATES PATENTS

| | | |
|---|---|---|
| Re. 13,019 | Hall et al. | Sept. 7, 1909 |
| 465,999 | Shaw | Dec. 29, 1891 |
| 497,370 | Eachus | May 16, 1893 |
| 568,569 | Herdman | Sept. 29, 1896 |
| 980,044 | Apple | Dec. 27, 1910 |
| 1,193,490 | Wood | Aug. 1, 1916 |
| 1,324,851 | Roos | Dec. 16, 1919 |
| 1,567,915 | Cole | Dec. 29, 1925 |
| 1,821,600 | Whitehead | Sept. 1, 1931 |
| 1,875,436 | Frese | Sept. 6, 1932 |
| 2,144,416 | Nevinger | Jan. 17, 1939 |
| 2,172,440 | Edmonson | Sept. 12, 1939 |
| 2,434,034 | Chapman | Jan. 6, 1948 |
| 2,479,344 | Goldfield | Aug. 16, 1949 |
| 2,514,693 | Chapman | July 11, 1950 |
| 2,620,901 | Stearns | Dec. 9, 1952 |